United States Patent [19]
Horvath

[11] Patent Number: 4,816,052
[45] Date of Patent: Mar. 28, 1989

[54] METHOD FOR MONITORING THE WIDTH OF MATERIAL IN STRIP FORM

[75] Inventor: Horst H. Horvath, Karlsruhe, Fed. Rep. of Germany

[73] Assignee: Siemens Aktiengesellschaft, Berlin and Munich, Fed. Rep. of Germany

[21] Appl. No.: 84,972

[22] Filed: Aug. 12, 1987

[30] Foreign Application Priority Data

Aug. 18, 1986 [DE] Fed. Rep. of Germany ....... 3627927

[51] Int. Cl.⁴ .................. C03B 18/04; G05B 21/02
[52] U.S. Cl. ................................ 65/29; 65/160; 358/107; 364/473
[58] Field of Search ........... 65/29, 160; 364/473; 358/107

[56] References Cited

U.S. PATENT DOCUMENTS

| | | | |
|---|---|---|---|
| 3,321,575 | 5/1967 | Lewczyk | 358/107 X |
| 3,779,731 | 12/1973 | Pollock et al. | 65/29 |
| 3,977,858 | 8/1976 | Taguchi | 65/29 X |
| 4,096,525 | 6/1978 | Latham | 358/107 |
| 4,310,850 | 1/1982 | Casler | 358/107 |
| 4,367,487 | 1/1983 | Klein et al. | 358/107 |
| 4,498,778 | 2/1985 | White | 358/107 X |

FOREIGN PATENT DOCUMENTS

| | | | |
|---|---|---|---|
| 3032950 | 4/1982 | Fed. Rep. of Germany . | |
| 540826 | 1/1977 | U.S.S.R. | 65/29 |
| 679536 | 8/1979 | U.S.S.R. | 65/160 |
| 2051414 | 1/1981 | United Kingdom . | |

Primary Examiner—Robert L. Lindsay
Attorney, Agent, or Firm—Kenyon & Kenyon

[57] ABSTRACT

The image of an edge (MK) of material in strip form, the width of which is to be monitored, is stored and shifted toward both sides parallel to the tolerance limits (TG1, TG2). The coordinates of the picture elements of the tolerance limit (TG1, TG2) are stored and compared with the coordinates of the picture element of the respective actual edge (AK). If its picture elements lie on or outside of the tolerance limits (TG1, TG2), an indication signal is generated.

The method is used in the manufacture of plate glass.

11 Claims, 1 Drawing Sheet

METHOD FOR MONITORING THE WIDTH OF MATERIAL IN STRIP FORM

BACKGROUND OF THE INVENTION

The invention relates to a method for monitoring the location of the edges of material in strip form.

In German Patent No. 30 32 950, an apparatus for evaluating electro-optically generated raster pictures is described, in which the location of a strip is determined by means of a video camera which generates a continuous image of a strip edge to defect a contrast jump for the purpose of regulating the running of the strip. For the evaluation, such raster picture is sampled line by line and in every line, the raster picture elements up to the chosen contrast jump are counted by means of a picture element counter. As a function of the latter's reading, a command signal for guiding the position of the strip into the desired position is formed. It is further stated in this patent the optical determination of the strip position it is difficult to assure sufficient contrast at the strip edges in the entire temperature range from about 20° to more than 1000° C. If the bright/dark contrasts are too weak, it could happen that the latter are no longer detected by the image converted so that measurement errors result which affect the proper evaluation. If, for instance, no contrast jump is determined in several lines of the raster pictures, this can be interpreted in the sense that the visible area of the strip covered by the camera is entirely covered up, or that the strip is not visible or does not exist at all.

Furthermore, contrast jump which occur within or without the strip due to contamination or by reflections can be evaluated in the sense that the strip edge is not straight, i.e., for instance, a part thereof is ragged or the running of the strip shifts in the visible range if more extensive contamination is the cause. With the known apparatus, such faulty evaluations are avoided by means of a second counter which causes a sort of averaging of the information over the course of the edge. Evaluation of a non-linear course of the edge such as occurs, for instance, in the case of melts, is not possible with the known apparatus.

In the manufacture of plate glass, the trailing edges of the liquid glass are monitored for determining and monitoring the strip thickness. To this end, a picture of the edges can be taken with a television camera and displayed on a monitor where it is observed by the operating personnel and monitored in accordance with subjective criteria. For easier operation, the liquid glass is observed not directly at the exit, but several meters thereafter so that disturbances are leveled out with a long delay.

SUMMARY OF THE INVENTION

It is an object of the present invention to provide a method with which edges of material in strip form are detected automatically. It is a further objective to detect an edge which differs only slightly from the surroundings and can be recognized only indistinctly in the image of the digitalized video signal.

The image of an edge (MK) of material in strip form, the width of which is to be monitored, is stored and shifted toward both sides parallel to the tolerance limits (TG1, TG2). The coordinates of the picture elements of the tolerance limit (TG1, TG2) are stored and compared with the coordinates of the picture element of the respective actual edge (AK). If its picture elements lie on or outside of the tolerance limits (TG1, TG2), an indication signal is generated.

The tolerance limits can be set by the operating personnel at the monitor. The shift can be determined from the number of shifting steps and the step width in picture elements.

BRIEF DESCRIPTION OF THE DRAWINGS

The invention as well as further embodiments and advantages will be described and explained in the following in greater detail, wherein.

DETAILED DESCRIPTION OF THE INVENTION

Figure 1A:
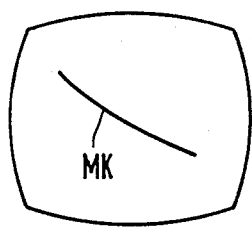
FIGS. 1a–1c illustrates a preferred embodiment of the invention.
Figure 1B:
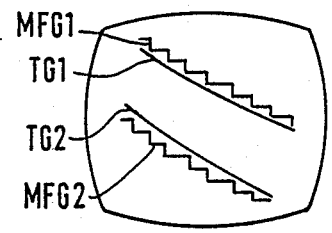

FIG. 1a shows the digitized picture of an edge MK of a running liquid glass. This picture is taken by a video camera, converted into a binary image and subjected to a socalled picture clean-up in which disturbing image structures generated by interference effects, and stray light have been eliminated. The width of the liquid glass strip is a measure of the thickness of the plate glass produced and it must be kept constant. A picture of the edge itself is utilized for setting the tolerance limits, within which the edge can lie. For this purpose a sample edge MK is recorded and stored and shifted in two directions so that a region is generated for bracketing the position of the actual edge as shown to form two tolerance limits. The tolerance limits TG1, TG2 are advantageously displayed on the picture screen of a display equipment (FIG. 1b). Since, for storing pictures, coordinates are assigned to the picture elements, the shifting of pictures is easily accomplished by adding and subtracting a constant value to one of the coordinates of each picture element. Shifts in one coordinate direction are simplest, but sometimes, a shift in two directions can be advantageous, for instance, perpendicularly to the course of the edge. However, it should be noted that the edge of liquid glass does not follow a straight line, particularly in the vicinity of the output, it is curved. The edges, however, must be monitored in the vicinity of the output so that changes can be leveled out or corrected as fast as possible.

Figure 1C:
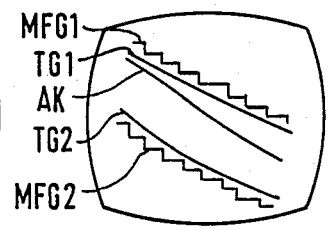

After the two tolerance limits are generated, the actual edge is monitored. FIG. 1c shows a picture of the two tolerance limits TG1, TG2 with the image of the actual strip edge AK in between. Since the spacing of the tolerance limits is known from the number of picture elements, the location of the actual strip edge AK relative to the tolerance limits can be determined from the number of elements between the edge and the tolerance limits. If the actual strip edge reaches a tolerance limit, (for example TG1) the glass flow is changed so that the edge moves back into the tolerance range. Alternatively, the distance of the actual strip edge from the tolerance limit can be used to control the flow of glass continuously before the strip edge actually reaches a tolerance limit. In this case the distance used as the control input can be a minimal distance or the average distance. The area between the actual strip edge and the tolerance limit can also be utilized as control criteria.

Tolerance limits must be set for both strip edges and the location of the two edges must be monitored. Because of the many disturbances in the automated formation of glass melts and in monitoring the location of strip edges of other industrial processes, not the entire picture is evaluated but only a selected region which covers the tolerance limits and the area in between. For this purpose, a measurement field with limits MFG1, MFG2 is formed as illustrated in FIGS. 1b and 1c, which covers the tolerance limits TG1, TG2. Only signals of picture elements which lie in the measurement field are considered in the evaluation. Picture elements outside the measurement range are ignored.

Figure 2:
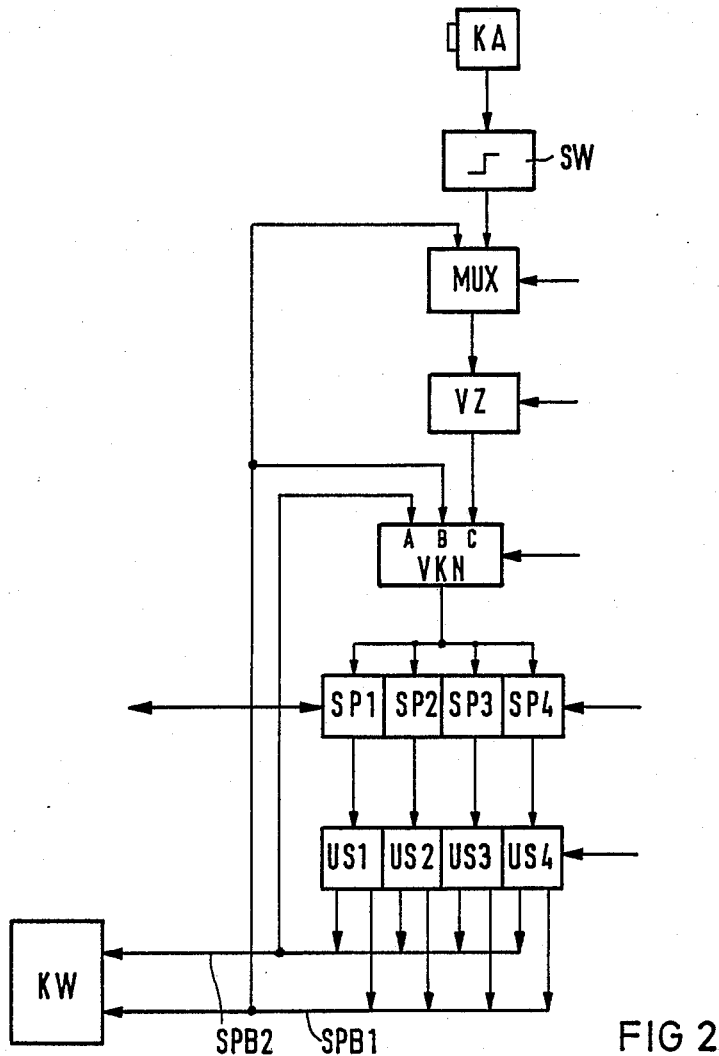
FIG. 2 shows the block diagram of an arrangement for carrying out the method according to the invention.

In FIG. 2 a device is shown having a fire box camera which is designated with KA and which monitors a glass melt for the manufacture of plate glass. It is followed by a threshold circuit SW, the output signal of which changes the signal state if the camera scans an edge. In the simplest case, the threshold circuit compares only the amplitude of the video signal with an amplitude threshold which is changed as a function of the mean video signal amplitude. The video signal, however, can also be processed through a filter within circuit SW, the output signal of which is compared with a threshold value by a comparator. Depending on the results of the comparison, a binary signal is generated. The binary signal, which may have a component indicative of a sign and an amplitude component, is fed to the logic circuit in such a manner that its binary output signal is changed if an edge is detected. A multiplexer MUX switches the output signal of the threshold circuit SW or one of four image memories SP1, SP2, SP3, SP4 selectably to a time delay circuit VZ, the output signal of which is fed to an input C of a control logic circuit VKN. Two further inputs A, B are connected via memory bus lines SPB1, SPB2 to the outputs of double-throw switches US1, US2, US3, US4. The output signal of the logic circuit can be fed selectably to one of four memories SP1, SP2, SP3, SP4, to which the double-throw switches US1, US2, US3, US4 are connected so that the memory contents can be switched selectably to one of the two memory bus lines SPB1, SPB2. In addition to the logic circuit VKN, an evaluation unit AW is connected to the memory bus lines.

In a first step of the procedure, a sample edge of the glass melt is recorded by the camera KA and the binary signal obtained thereby is entered into one of the four memories, for instance, into the memory SP1. This image is heavily distorted by interference effects and is therefore not yet suitable for generating the tolerance limit. For cleaning up the picture, the picture data contained in the memory SP1 are switched to the memory bus SPB1 and fed via the multiplexer MUX to the time delay unit VZ and shifted there by an adjustable number of picture elements in a selectable direction. The picture data delayed in this manner are combined with the original picture data in the logic circuit VKN by AND gates, so that all picture interferences extending in the chosen shift direction, which is smaller than the shift distance, are eliminated. This procedure can be repeated for several shift directions. Advantageously, the shift is made only in the direction transversal to the movement of the edge and more specifically, first in the one direction and then in the opposite direction. This method of cleaning up the picture as well as the arrangement according to FIG. 2 is given in detail in European Patent Application No. 86 108 673.4.

After the image of the sampled edge is cleaned up and entered into the memory SP1, it is shifted in any desired direction, for instance, in the direction of the raster lines, perpendicularly thereto or perpendicularly to the course of the edge until the desired tolerance limit is reached. The shift can be checked on a monitor. The shifted picture, i.e., the first tolerance limit, TG1 is entered into the memory SP2. Thereafter, a picture shift in the opposite direction is made. When the second desired tolerance limit is reached, the then shifted image can be transferred into the memory SP3 as TG2. The two memory contents can be read out simultaneously, combined by an OR gate in VKN and entered into the memory SP1 so that for three process steps, the three memories SP1, SP2, SP3 are occupied.

Alternatively, the raw, unprocessed binary image is first entered into the memory SP2, and is then cleaned up and compared with the picture of the tolerance limits contained in the memory SP1. The comparison can be made by the logic circuit VKN which, when the strip edge and the tolerance limits are displayed by logical "1" signals, combines the signals by an AND function at the inputs A, B, and enters them into the memory SP3. In the latter are again contained the intersections of the strip edge and the tolerance limits.

This method has the disadvantage that the image of the strip edge can have gaps and that therefore, in a comparison of the image of the strip edge with the tolerance limit, intersections cannot be ascertained under some conditions. This disadvantage cannot be ascertained under some conditions. This disadvantage can be avoided by the provision that the places in the memory SP1 which correspond to picture elements outside the tolerance limits, are filled with logical "1" signals. In this case, indication signals are entered into the memory SPB3 if the strip edge reaches or exceeds a tolerance limit.

In the subject application not only is it determined whether the tolerance limit is reached or not, but also the distance from the tolerance limit is found so that an early control intervention can be made. To this end the picture of the actual strip edge is shifted by picture elements in the same direction as when the tolerance limits are set. The number of steps until a tolerance limit is reached is then a measure for the distance.

It goes without saying that the comparison between the actual strip edge and the tolerance limits can also be carried out in the evaluation unit KW by, for instance, counting there in every line the distance of the picture elements. Mean values can also be formed or the area between the actual edge and the tolerance limits can be determined and a control signal derived therefrom.

Since the position of the strip edge changes only slowly, it is sufficient to limit the monitoring to one measuring field, the picture elements of which lie in the monitoring area or only slightly outside. It is achieved thereby that erroneous reports of exceeding current limits which lie far outside the tolerance range and therefore cannot occur suddenly, are suppressed The measuring field can be stored in an additional memory corresponding to the memories SP1, SP2, SP3, SP4. Like the tolerance range, it can be formed by shifting the image of the sample edge, and specifically beyond the tolerance limits. The memory cells which are associated with picture elements lying in the measuring field are loaded with logical "1" signal and the others are loaded with a logical "0" signal. If then the contents of the additional memory is AND-ed with the picture data of the actual strip edge, all interference lying outside the field of measurement is suppressed in the actual picture. The formation of the measurement field and the limitation of the evaluation to picture elements lying in the field of measurement can also be performed in the evaluation unit KW.

What is claimed is:

1. A method for monitoring the width of material in strip form, with an image evaluation device consisting of a television camera which generates analog signals corresponding to a picture of the edges of the material, a digitizing unit which converts the analog video signals into digital signals, and a memory for storing the digital signals comprising the steps of:

shifting the picture of a sample edge in two opposite directions to define two tolerance limits;

storing the tolerance limits;

comparing the images of each of successive recorded actual edges of the material with the tolerance limits; and generating an indication signal indicative of the position of the actual edges with respect to the tolerance limits.

2. The method according to claim 1, wherein a control signal is derived from the indication signal for changing the position of the edges with respect to the tolerance limits.

3. The method according to claim 1, wherein the difference between the tolerance limits and the actual edges is determined and a control signal is generated as a function of this difference.

4. The method according to claim 1 wherein an indication signal is generated only when an actual strip edge is located within a measurement field defined by said tolerance limits.

5. The method according to claim 1 wherein the images of the tolerance limits and of the actual strip edge are displayed on a monitor.

6. A method for controlling the width of a glass melt used for the manufacture of plate glass with an image evaluator device consisting of a television camera which generates analog signals corresponding to edges of said glass melt, a digitizing unit which converts said analog signals into digital signals and a memory for storing the digital signals comprising the steps of:

generating first analog signals corresponding to a sample edge of known width;

shifting said first analog signals in a first and second direction to generate first and second corresponding tolerance limits;

digitizing and storing said tolerance limits;

generating second analog signals corresponding to edges of a glass melt;

digitizing said second analog signals to obtain sample digital signals;

comparing said sample digital signals to said tolerance limits;

generating an indication signal related to the positions of said sample signals to said tolerance limit; and changing the position of said glass melt with respect to said tolerance limits in response to said indication signal.

7. The method of claim 6, wherein said indication signal corresponds to the difference between said sample signals and one of said tolerance signals.

8. The method of claim 6 further comprising generating first and second measurement fields bordered by said tolerance limits, wherein said indication is generated when said sample signals overlap one of said measurement fields.

9. The method of claim 6, wherein said indication signal is indicative of an instantaneous distance between said sample signals and said tolerance limits.

10. The method of claim 6, wherein said indication signal is indicative of an average distance between said sample signals and said tolerance limits.

11. The method of claim 6, wherein said indication signal corresponds to an area defined between said sample signals and said tolerance field.

* * * * *